Sept. 13, 1955     A. M. CHAMBERS, JR., ET AL     2,717,790

SEALING DEVICES

Filed Feb. 25, 1953

INVENTORS,
Albert M. Chambers, Jr.
BY John J. Patrick

Robert Henderson
ATTORNEY.

United States Patent Office 2,717,790
Patented Sept. 13, 1955

2,717,790

SEALING DEVICES

Albert M. Chambers, Jr., and John J. Patrick, Palmyra, N. Y., assignors to The Garlock Packing Company, Palmyra, N. Y., a corporation of New York Application February 25, 1953, Serial No. 338,802

4 Claims. (Cl. 286—11)

The present invention relates to a sealing device for effecting a seal between a rotary shaft and an opening in a machine casing through which the shaft extends. More particularly, the invention relates to a sealing device in which most or all of the rotating parts of the device are enclosed within a sheet-metal shell.

An important object of this invention is the provision of a sealing device in which very simple and inexpensive means are employed for holding the parts unitarily associated with such a shell and wherein such unifying means also cooperate with other parts to improve the operation of the device, and assist in the assembling of the device during its manufacture.

Another important object of this invention is the provision of such a sealing device in which the shell has a closure plate, formed with portions which function to constrain certain parts within the shell to rotate therewith.

Another important object of this invention is the inclusion therein of an annular spring seat which also functions as a means for preventing too great an extension of a compressed coil spring therein and hence avoids undue protrusion of a certain spring-pressed part from the shell.

Another important object of this invention is the provision of such a sealing device wherein such an annular spring seat serves also as means which are effective during initial assembly of the device to aid in properly locating a sealing diaphragm used as a part of the device.

The foregoing and other objects of this invention are accomplished by a device which, for illustrative purposes, is illustrated in the accompanying drawing without limiting the invention, however, to that particular embodiment.

Figure 1:
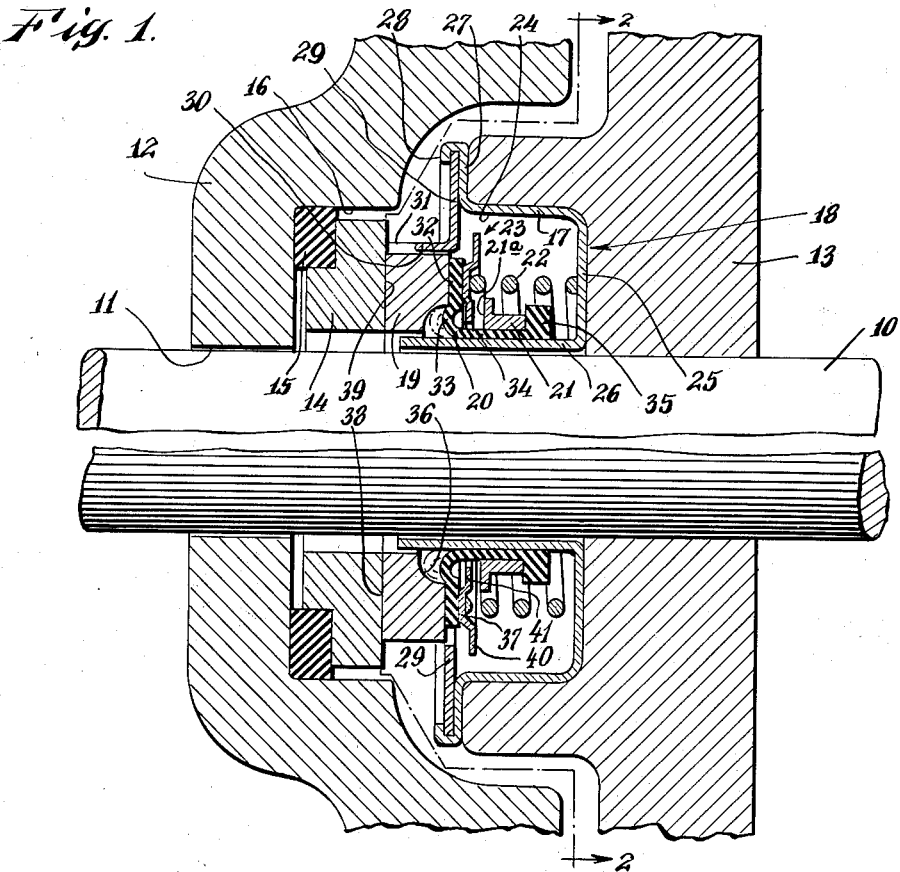
Figure 1 is an axial sectional view, of a preferred form of sealing device according to the present invention, shown in association with a shaft, a machine casing and an operating part adapted to turn with the shaft relatively to the machine casing.
Figure 2:
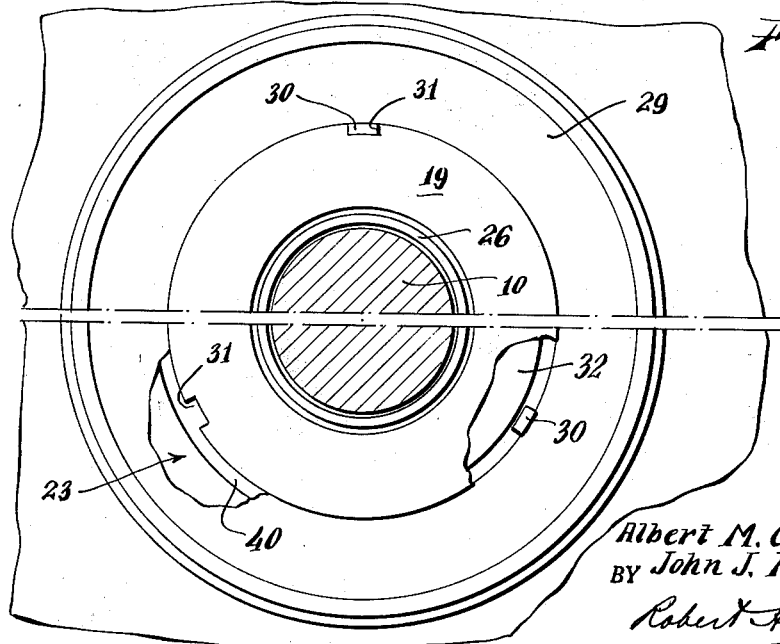
Fig. 2 is a cross-sectional view substantially on the line 2—2 of Fig. 1; the sealing device itself being in end elevation.

As best understood from Fig. 1 of the drawing, a rotary shaft 10 extends through a shaft opening 11 in a machine casing 12 which may, for example, be a casing of a rotary pump or the like. At an inner portion of the shaft there is fixed thereto an impeller 13 (of which only a fragment is shown) constrained to rotate therewith. Obviously, means must be provided for preventing fluid from within the pump casing 12 from escaping therefrom along the shaft through the shaft opening 11. It is for this purpose that a sealing device according to the present invention is provided.

The present invention, as disclosed herein, is embodied in a seal having two relatively rotatable sealing rings of which one is sealed fixedly to the machine or pump casing and the other is somewhat yieldably but, nevertheless, sealingly associated with the shaft. If desired, however, the relationships of the two said sealing rings may be reversed relatively to the pump casing and the shaft. Such an alternative might, for example, involve having one of said sealing rings yieldably sealed to the machine casing and the other substantially non-yieldably sealed to the shaft.

In the illustrated embodiment of the present invention, a stationary sealing ring 14 is supported in non-rotative relationship to the pump casing by means of a gasket 15 seated within an annular recess 16 in the interior of pump casing 12 and adjacent to the shaft opening 11.

In the face of the impeller 13 which faces the recess 16, and somewhat similar to the latter, is a recess 17, and within the latter recess are fluid-tightly fitted the rotary parts of the sealing device. These parts consist of an annular cup-shaped shell 18, a rigid rotary sealing ring 19 adapted to effect a sliding sealing contact with the stationary sealing ring 14, a flexible sealing element 20, a preferably metal compression ring 21 for compressing the flexible sealing element 20 into tight association with the shell 18, a compression coil spring 22, and an annular spring-seat element 23.

The shell 18 is formed, preferably, of sheet metal with an outer cylindrical wall 24 which is held, with a press fit, fluid-tightly within an adjacent cylindrical wall defining the annular recess 17. Continuing radially inwardly from the inner end of the cylindrical shell wall 24, the shell has an inner end radial wall 25 which, where the device is employed in an annular recess such as recess 17, backs against the bottom radial wall of said recess. Continuing outwardly from the inner end of the shell's radial wall 25, the shell has an inner tubular wall 26 which extends along the shaft 10 although not necessarily in contact therewith. The shell's cylindrical wall 24 is bent outwardly to form a radial flange 27, the outer marginal portion of which is bent outwardly and back upon itself to rigidly grip an outer marginal portion of a shell closure or cover 29. This shell cover is annular in form and extends radially inwardly somewhat beyond the cylindrical wall 24, and is formed with at least one and preferably several axially outwardly extending fingers 30. These fingers extend slidably within a corresponding groove or grooves 31 formed in the outer periphery of the rotary sealing ring 19 to constrain the latter to rotate with the shell, which in turn, of course, rotates with the shaft and the impeller.

The flexible sealing element 20 is preferably formed, as by molding, of rubber, synthetic rubber or other suitable rubber-like material. It has an outer radial flange 32, the outer side of which lies against and preferably is cemented to the inner face of the rotary sealing ring 19. Continuing radially inwardly from the inner margin of the flexible sealing element's radial flange 32, said sealing element is formed with a generally U-shaped web 33, from the radially innermost portion of which extends a tubular portion 34 and the inner end of this tubular portion terminates in an outwardly extending radial flange 35. The convex side of the U-shaped web 33 faces toward the rotary sealing ring 19, and the latter preferably is formed with an annular cavity 36 into which said web may roll, as indicated in broken lines in the drawing, on occasions, either in assembly or in operation, when the rotary sealing ring 19 may be pressed farther into the shell than it is shown in the drawing.

The tubular portion 34 of the flexible sealing element preferably is a fluid-tight fit upon the outer surface of the tubular shell wall 26, but to enhance the engagement of said tubular portion with said tubular shell wall, the compression ring 21, of metal or other relatively rigid and non-elastic material, extends tightly about said tubular portion 34 to compress the latter upon the tubular wall 26. The compression ring 21, preferably, is a continuous or non-split ring and may advantageously be formed with an end radial flange 21a to increase its rigidity. The said compression ring, preferably, is fitted snugly within the angle formed by the tubular portion 34 of the flexible sealing element and said element's radial flange 35.

The coil spring 22 is compressed between the shell's inner end radial wall 25 and an annular trough 37 of the spring-seat member 23, causing the latter to press firmly against the radial flange 32 of the flexible sealing element, and also causing the outer face 38 of the rotary sealing ring 19 to press against and effect a sliding seal with an opposed inner flat face 39 of the stationary sealing ring 14. Thus, the flexible sealing element 20 effects a seal between the rigid sealing ring 19 and the shell which, in turn, is in fixed sealing association with the impeller 13 and the shaft 10; and, as the rotary sealing ring 19 effects a rotary sliding seal with the stationary sealing ring 14, which, in turn, is gasketed to the pump casing, it is apparent that an effective seal is provided which prevents fluid from escaping from the interior of the pump casing.

The spring-seat member 23, in addition to having the spring-receiving trough 37, is formed with a flat, annular outer extension 40 which extends radially outwardly beyond the radially innermost limit of the shell cover 29. Thus, even when the device is not in use, the spring 22 cannot press any of the rotary parts of the device out of the shell, for the extension 40 functions as an abutment which engages an inner marginal portion of the shell cover 29 to limit its outward movement. The outward movement of the rotary sealing ring 19, however, is not directly thus restricted, but such outward movement of said rotary sealing ring is prevented because of the fact that it is cemented to the radial flange 32 of the flexible sealing element and the latter, even though flexible, tends to retain its originally molded shape, which is only slightly different from the shape thereof shown in Fig. 1. Stated differently, the molded shape of the flexible sealing element 20 tends to keep the radial flange 32 of that element and the rotary sealing ring 19 from moving outwardly except as positively pressed outwardly by the spring 22 and, as already explained, the action of the latter spring is definitely limited by the abutment of the spring-seat member 23 with the inner margin of the cover or closure plate 29.

It may be observed also that the spring-seat member 23 is formed with an inner annular extension 41 which extends radially inwardly to a smaller internal diameter than the external diameter of the compression ring 21 and, more particularly, of the latter's radial flange 21a. Thus, when the spring-seat member 23 is pushed inwardly against the compressive force of the spring 22, the extension 41 either is limited in its inward movement by engagement with the flange 21a of the compression ring, or it actually pushes the compression ring farther inwardly, carrying with it the tubular portion 34 of the flexible sealing element 20. This condition is of little use during operation, but it is of some importance in the assembly of the device.

In assembling the device, the spring-seat member 23 is first passed over the small end of the flexible sealing element, followed by the compression ring 21. To thus put these two parts in place about the sealing element, it is necessary to fold or deform the radial flange 35 inwardly to some extent and then release it after the parts 23 and 21 are in their approximate positions in relation to the flexible sealing element. Thereafter, the spring 22 is placed in the shell and the tubular portion 34 of the flexible sealing element is headed into said spring and over the shell's tubular wall 26 from the spring's outer end.

As the mentioned tubular portion 34 is a very tight fit upon the shell wall 26, and as the compression ring 21 squeezes the tubular portion of the flexible sealing element upon the tubular shell wall, the sealing element is pushed into place only under considerable friction between it and the tubular shell wall. Furthermore, during this pushing of the flexible sealing element into place in the shell, the compressive force of the spring 22 is encountered. At a certain stage of this procedure, the extension 41 of the spring-seat member presses against the compression ring 21 and the latter, in turn, presses against the radial flange 35 of the flexible sealing element; so that a positive means is provided for pushing the sealing element into its proper position within the shell despite the opposition of the spring and of friction to such pushing movement.

It may be seen from the foregoing that the shell cover 29 serves not only as a means for enclosing rotary parts of the device within the shell but also serves, through its fingers 30, to prevent torque stresses in the flexible sealing element 20 by constraining the rotary sealing ring to turn with the shell and with the impeller and the shaft. The rotary sealing ring 19, however, is permitted to undergo limited axial movements in order to maintain effective sliding sealing association with the stationary sealing ring 14, even in the presence of vibrations, end play of the shaft or other irregularities in operation which might tend to separate the two sealing rings.

It may be seen also that the spring-seat member 23 not only serves as a seat for the spring 22, but it also has one marginal portion which functions as an abutment with reference to the shell cover 29 to limit the outward movement of parts within the shell and also has another marginal portion which cooperates with the compression ring 21 to facilitate the insertion into the shell of the flexible sealing ring and also to assure that the latter will be properly positioned within the shell.

Although only one illustrative embodiment of the present invention has been shown and described, it should be obvious that the present inventive concept may be utilized in numerous other structures without, however, departing from the spirit of the invention as set forth in the following claims.

We claim:

1. A sealing device for effecting a seal between a rotatable shaft and a machine-casing opening through which the shaft extends, comprising an annular, cup-shaped shell, fluid-tightly associated with said shaft and constrained to turn therewith, the said shell having radially spaced, cylindrical walls and a radial wall integrally interconnecting said cylindrical walls at corresponding ends thereof, a sealing ring at the open side of said shell, adapted to effect a sliding rotary seal with a radial surface associated with said machine casing, a flexible sealing element within said shell having a radial flange at its outer end in back of and fluid-tightly associated with said sealing ring, a flexible sleeve in circumferential contact with the inner cylindrical wall of the shell and having a radially outwardly extending surface associated therewith, and a flexible web interconnecting the flexible sealing element's radial flange and sleeve, an annular closure flange, at the free edge of the outer cylindrical shell wall, having, at its inner periphery, a sliding driving connection with said sealing ring constraining the latter to rotate with the shell while permitting axial movement of said ring relatively to the shell, a spring, within the shell, coacting with the latter and with said radial flange of the flexible sealing element to urge said flange and the sealing ring outwardly, and an annular, one-piece, spring-seat member disposed between the said spring and radial flange and between said closure flange and said radially outwardly extending surface and having inner and outer marginal portions in axial alignment respectively with said radially outwardly extending surface and with said closure flange to limit the axial movement of the spring-seat member to the axial space between said radially outwardly extending surface and said closure flange.

2. A sealing device according to claim 1, the said sleeve having an integral, radial flange at its inner end, and the device further including a compression ring encircling said sleeve outwardly of the latter's said radial flange and backed axially against the latter, and the mentioned radially outwardly extending surface associated with the sleeve being an outwardly facing radial surface of said compression ring.

3. A sealing device according to claim 1, the said spring-seat member having therein an annular groove between said inner and outer marginal portions for receiving and centering an adjacent end of said spring.

4. A sealing device according to claim 1, the said spring-seat member being substantially flat, the spring-seat member's said outer marginal portion being adapted to abut an inner surface of said closure flange to limit axial movement of the spring-seat member outwardly, and the spring-seat member's said inner marginal portion being adapted to abut said radially outwardly extending surface to limit axial movement of the spring-seat member inwardly.

References Cited in the file of this patent

UNITED STATES PATENTS

| | | |
|---|---|---|
| 2,089,773 | Vedovell et al. | Aug. 10, 1937 |
| 2,192,395 | La Bour | Mar. 5, 1940 |
| 2,432,694 | Snyder | Dec. 16, 1947 |
| 2,499,353 | Brummer | Mar. 7, 1950 |
| 2,506,447 | Greiner | May 2, 1950 |
| 2,575,818 | Kosatka | Nov. 20, 1951 |
| 2,598,886 | Brummer | June 3, 1952 |